INVENTOR
JOHN E. WALDRUM

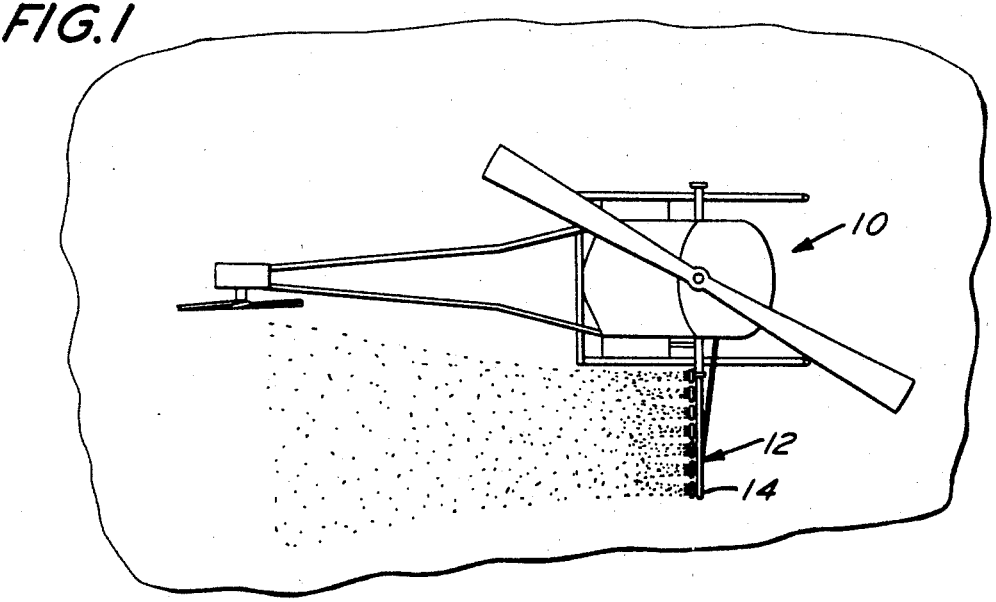
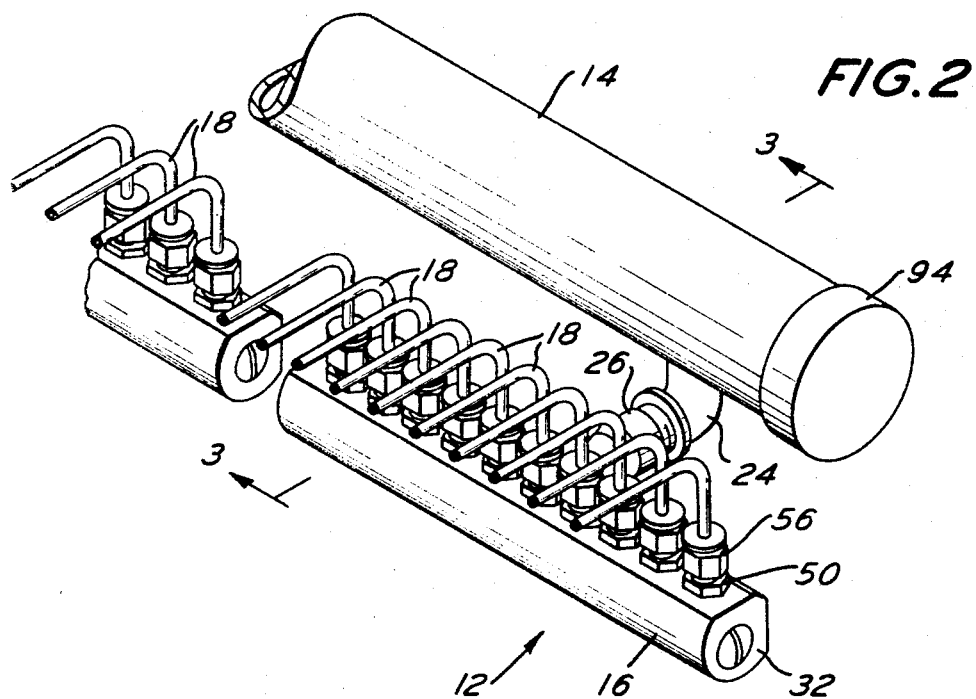

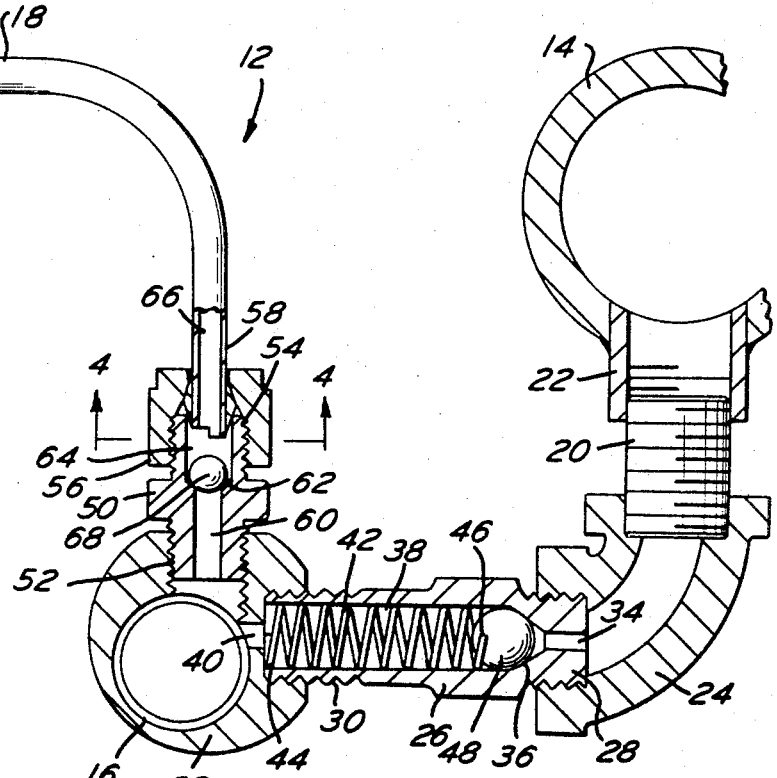

United States Patent Office 3,445,065
Patented May 20, 1969

3,445,065
UNIFORM DROPLET DISCHARGE SPRAYER UTILIZING AN ABSORBENT MATERIAL THEREIN
John E. Waldrum, Ambler, Pa., assignor to Amchem Products, Inc., Ambler, Pa., a corporation of Delaware
Filed May 31, 1966, Ser. No. 558,539
Int. Cl. B05b 1/20; B64d 1/18
U.S. Cl. 239—159                                5 Claims

ABSTRACT OF THE DISCLOSURE

A uniform sprayer involving a movable nozzle to which a liquid supply is led and discharged therefrom in laminar flow, with the direction of discharge being substantially opposite to the direction of nozzle movement, such that the discharge stream breaks up into droplets of substantially uniform size. The invention involves a sprayer with a hollow body filled with an absorbent material with liquid being fed into the hollow body and into the absorbent material to be sprayed through discharge openings in the hollow body to substantially eliminate drippage upon shut off of the liquid supply.

---

This invention relates to a uniform sprayer and more particularly relates to a spray device that can be used for aerial spraying operations, although it is also adapted to be utilized with land equipment.

The problem of "drift" is well known in connection with the application of systemic herbicides. The powerful properties of a systemic herbicide are such that a few drops of the systemic herbicide are sufficient to kill a plant. While systemic herbicides are selective, such herbicides will attack certain economic crops. The problem arises during spraying because of uncertain winds, drafts, etc. which will at times displace or modify the movement of the herbicide droplets and cause the same to be carried to unwanted areas.

A considerable number of solutions to the problem of drift have been heretofore suggested and have met with varying degrees of success. One proposal involves the utilization of a very heavy invert herbicide emulsion with the expectation that only large heavy drops will be formed during spraying which are not easily influenced by external forces. However, the preparation and spraying of invert emulsions requires time and otherwise adds expense to the spraying operation.

It is recognized that the problem of drift is particularly acute when many fine droplets are produced in the spray operation. The fine droplets are more easily carried away and are displaced a greater distance by cross winds than the larger droplets as noted in the Handbook on Aerial Application in Agriculture (December 1956) published by the A & M College of Texas, College Station, Tex.

The problem is particularly set forth on pp. 54 and 55 of said handbook which discusses the desirability of shortening the time in which the droplets are in the air in order to decrease the probability of the droplets being swept away by a cross wind. The handbook then goes on to suggest the desirability of having spray devices that will produce substantially uniform droplet sizes. However, the spray devices either currently in use or that have been suggested seem always to produce enough fine particles so that the problem of drift remains ever present.

It is also known that when a liquid under pressure is discharged in a laminar stream from a stationary nozzle that the droplets formed from the emerging stream tend to subdivide into a primary droplet and a smaller satellite droplet which forms generally behind the primary droplet. In the aforesaid formation process, the complex stresses as explained by the principles of fluid dynamics acting upon the droplet tend to exert a stretching action on the droplet, especially as the vertical component of fall becomes more prominent and the horizontal component of spray discharge becomes less significant.

The droplets thus begin to possess a backward tail which quickly severs itself from the remainder of the droplet under the further downward pull of gravity to become the satellite droplet. The satellite droplets are considerably smaller than the primary droplets, and thus the satellite droplets are in effect fine droplets that would tend easily to drift.

With the present invention, spray discharge in laminar flow is maintained with the nozzle itself being moved in a direction substantially opposite to the direction of spray discharge. This tends to hold the freshly discharged stream a little longer essentially in a horizontal plane during the crucial early stages of drop formation.

While the invention is not to be limited to any particular theory of operation, it is believed that the forward component of nozzle movement interacts with the backward component of liquid discharge to exert a holding or drag upon the droplets in the early stage of droplet formation so that the primary drop tends to crowd out or eliminate the satellite drop. Another way of considering this phenomenon is that the holding-up action tends to cancel out the force that would produce the tail of the droplet or that the tail of the droplet is maintained within the primary drop.

In any event, in the practice of the present invention the formation of tails is substantially eliminated, and in this way the formation of satellite drops is substantially eliminated.

The net result is the production of unusually uniform droplets in a spray pattern. The combination of uniform droplet sizes plus the setting of the nozzle orifice to achieve droplets of desired size acts to produce a uniform spray pattern which essentially lacks fine droplets, and therefore the problem of drift is considerably minimized.

It is accordingly an object of the present invention to provide a uniform sprayer which will spray herbicides and other liquids in droplets of unusually uniform size, particularly from a moving object, such as a helicopter.

Yet another object of the present invention is to provide a uniform sprayer that is relatively simple in manufacture and operation involving low cost and relatively little maintenance.

Another object of the present invention is to provide a uniform sprayer in airfoil configuration which may also include means to prevent drip or run-off of excess herbicide following the time when cessation of the spraying operation is desired.

Yet another object of the present invention is to provide a spray device with means to prevent undesirable dripping at and after such time as the device is shut off.

The foregoing as well as other objects of the invention are achieved by providing a uniform spray device which basically involves means to feed a liquid to nozzles for discharge in laminar flow. The nozzles are pointed in a direction generally opposite to the direction of movement of the nozzle either in the air or along the ground. The liquid stream thus discharged rearwardly is influenced by the forward movement of the nozzle itself such that in the initial stage of droplet formation a holding-up action is exerted which substantially eliminates the formation of fine satellite particles.

The discharge nozzle is fed through a liquid distribution system which eliminates the loss of head towards the end nozzles which would be inherent in a series fed system. Instead, the liquid is fed from an intermediate line into a discharge line to which the individual nozzles are connected. Undesirable dripping upon shut-off of the supply is avoided by means of ball members which immediately close the liquid passage upon removal of liquid pressure with the shutting-off of feed valves.

The present invention may also be embodied in airfoil form whereby a hollow member of generally elliptical cross-section includes discharge ports with the hollow space being generally occupied by a sponge or other absorbent member.

Other objects and many of the attendant advantages of this invention will be readily appreciated as the same becomes better understood by reference to the following detailed description when considered in connection with the accompanying drawings wherein:

FIG. 1 is a plan view of a helicopter equipped with the uniform sprayer of the present invention during an actual spraying operation;

FIG. 2 is a fragmentary enlarged perspective view showing a portion of the uniform sprayer of the present invention;

FIG. 3 is an enlarged sectional view taken along the lines 3—3 of FIG. 2;

FIG. 4 is a sectional view taken along the lines 4—4 of FIG. 3;

FIG. 5 is a schematic view showing drop formation in the case of the liquid being discharged in laminar flow from a stationary nozzle;

FIG. 6 is a view similar to FIG. 5 with the nozzle being moved in a direction opposite to the liquid discharged;

Figure 7:
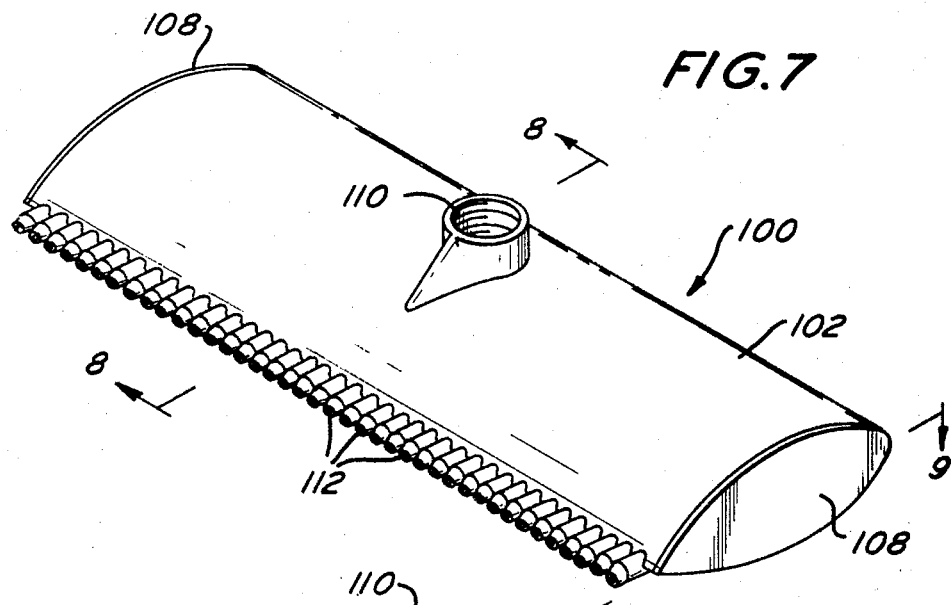
FIG. 7 is a perspective view of an alternate embodiment of the uniform sprayer of the present invention.
Figure 8:
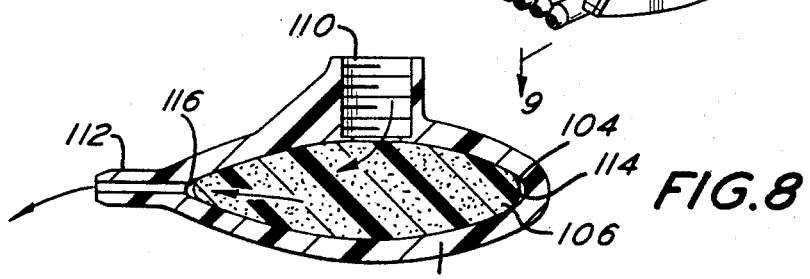
FIG. 8 is a somewhat enlarged sectional view taken along the lines 8—8 of FIG. 7.
Figure 9:
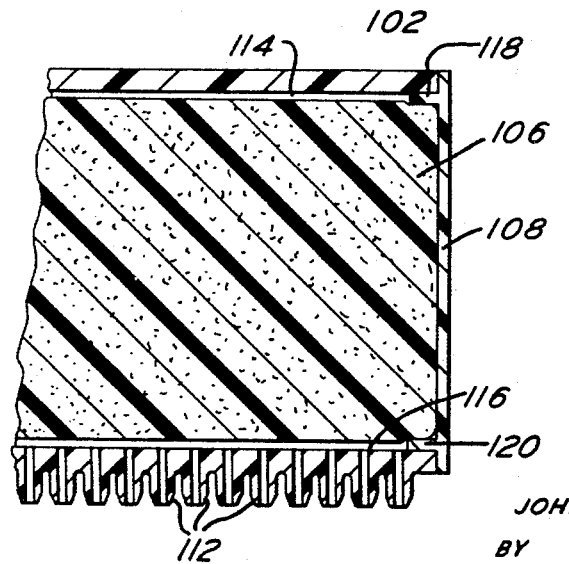
FIG. 9 is a somewhat enlarged fragmentary sectional view taken along the lines 9—9 of FIG. 7.

Referring now in greater detail to the various figures of the drawings wherein like reference characters refer to like parts, there is shown in FIG. 1 a plan view of a helicopter 10 equipped with a uniform sprayer 12 constituting a first embodiment of the present invention, shown during an actual spraying operation. Further details of the uniform sprayer 12 are shown in FIGS. 2, 3 and 4.

As best shown in FIGS. 2 and 3 the uniform sprayer 12 basically comprises intermediate line 14, discharge line 16 and discharge nozzles 18.

Liquid herbicide of water thin consistency or other liquid is fed from a source of supply carried by the helicopter 10 and fed to intermediate line 14 by gravity or pumping action, whichever is desired. The herbicide or other liquid travels from intermediate line 14 to discharge line 16 through connecting hardware including nipple 20 which connects female threaded opening 22 in the intermediate line 14 to L 24.

The connection between the L 24 and discharge line 16 is accomplished by virtue of specially designed nipple 26 which has a male threaded end 28 that is received by the L 24 and which has another male threaded end 30 which is received by appropriate threads in elongated body 32 which encloses the discharge line 16.

The actual liquid connection between the L 24 and the discharge line 16 involves port 34 in the nipple 26 which then merges into an outwardly tapering area 36 that becomes large open area 38 that runs for the remainder of the nipple 26. The liquid connection between nipple 26 and discharge line 16 is made through port 40 as indicated in FIG. 3. Fitted inside large annular area 38 is a spring 42 having one end 44 positioned adjacent port 40 and against body 32. The other end 46 of coil spring 42 rests against ball 48 which is positioned at least partially in the tapering area 36.

The ball 48 serves to provide an instant shut-off action whenever the fluid pressure is relieved as when a shut-off valve (not shown) is closed whenever it is desired to stop the spraying action. During the spraying action the liquid pressure works against the ball 48, and thus spaces it from the tapered sides defining tapering area 36 with the liquid pressure forcing the ball 48 to move against the bias of spring 42.

Hence, so long as the spraying operation continues, the liquid pressure forces the ball 48 against the spring 42 and the liquid thereby can pass through the large open area 38 to the port 40 into discharge line 16 for spraying through nozzles 18 as will be discussed hereinafter.

The connection between the discharge line 16 and the nozzles 18 is also shown in FIG. 3 wherein a threaded end 52 of nipple 50 is directly screwed into a threaded opening in body 32. The other threaded end 54 of the nipple 50 is screwed into a connecting link 56 which has an opening to receive one end 58 of the L-shaped nozzle. A liquid tight connection is achieved by compression fittings in a manner well known to those skilled in the art.

As further shown in FIG. 3 the liquid connection between the discharge line 16 and the nozzle 18 is achieved by virtue of port 60 in the nipple 50 which widens somewhat in beveled area 62 to opening 64 which communicates directly with passage 66 in the nozzle 18. A ball 68 is provided which rests upon the tapered walls comprising beveled area 62. The ball 68 also serves substantially to eliminate dripping when the fluid pressure is shutoff. The ball 68 is similar in operation to the ball 48 and the ball 68 may be either spring actuated or gravity actuated.

It is seen that when the liquid pressure is turned on the ball 68 will be moved upwardly from the beveled surface 62 in order to permit liquid discharge. However, as soon as the liquid pressure is turned off the ball 68 will return to the position of FIG. 3 either under spring action or by virtue of gravity and thereby prevent further liquid escape.

The liquid pressure is to be so adjusted, taking into account the size of the openings 66 in the nozzle 18 that the herbicide or other liquid discharge from the nozzle 18 will be in laminar flow as the concept of laminar or streamline flow is known to those skilled in the art. See Chemical Engineers' Handbook (John Perry, McGraw-Hill 1950), p. 375. It is preferable that spray discharges be clear so that all turbulence is absent. It is to be recognized that where the turbulent flow range is approached the presence of swirls of turbulence in the transition range may start to promote the formation of fine particles by virtue of satellite formation or other complex stresses which tend to introduce a disturbing effect into the spray pattern.

As shown in FIG. 3 the discharge opening 70 of the nozzle 18 points leftwardly or in a rearward direction. Thus, with the operation of the present invention the nozzle 18 would be moved forwardly or to the right as observed in FIG. 3. The actual operation can be understood by a consideration of FIGS. 5 and 6 of the drawing.

A stationary nozzle 18 is shown in FIG. 5 with the herbicide or other liquid emerging therefrom in laminar flow. FIG. 5 shows satellite formation. It is thus seen from FIG. 5 that the droplets formed from the emerging stream tend to subdivide into a primary droplet and a small droplet which forms generally behind the primary droplet. In observing FIG. 5 it will be seen that droplet 72 is representative of a spherical configuration possessed by a primary droplet immediately upon formation. Droplet 74 shows the initiation of a backward stretching action which becomes more pronounced in droplet 76 as the vertical component of fall becomes more prominent and the horizontal component of spray discharge becomes less significant. With droplet 78 a definite tail 80 has formed.

With further fall and lateral movement, the stretching action continues until the tail 80 is practically a separate entity in droplet 82, and in droplet 84 the tail 80 has become a satellite particle 86. It is, of course, possible for more than one satellite droplet to form from a primary droplet, and it is even conceivable that the satellite particles themselves may further divide into sub-satellite particles.

The operation of the present invention is schematically shown in FIG. 6 wherein the spray discharge is in the rearward direction of arrow 88 with the nozzle 18 being moved forwardly in the direction of arrow 90. Thus, in FIG. 6 the laminar discharge is being propelled in a direction substantially opposite to the direction of nozzle movement. This is believed to hold the freshly discharged stream a little longer essentially in a horizontal plane during the crucial early stages of drop formation.

While the invention is not to be limited to any particular theory of operation, it is believed that the forward component of nozzle movement in the direction of arrow 90 interacts with the backward component of liquid discharge in the direction of arrow 88. The net result is believed to exert a holding or drag upon the droplets 92 so that the primary drop will tend to crowd out, swallow up or otherwise eliminate the satellite drop. Another way of considering this phenomenon is that the holding up action tends to cancel out the forces which would produce the tail of the droplet or that the tail of the droplet is maintained within the primary drop.

The present invention has been tested in actual helicopter flight and has produced unusually uniform droplet patterns. While reliance upon laminar flow necessarily limits pumping speed, spraying capacity is not adversely affected because it is a simple matter to widen the span or increase the number of spray banks. In view of the importance of maintaining the spray pattern, it is preferred that the spray nozzles be secured as remote as possible from the helicopter propellers. For instance, spray nozzles in accordance with the invention have been successfully secured upon the skids of the helicopter.

As shown in FIG. 2 the intermediate line 14 is closed off at the ends thereof by means of a cap 94 with the herbicide or other liquid thereby being forced into discharge line 16. It is to be noted that the intermediate line 14 serves to balance out the usual pressure drop which is encountered with series feeding. In other words, if one end of the discharge line was directly fed, the more remote nozzles would be under lower liquid pressure than the upstream nozzles. This would have the effect of producing a variable spray pattern. With the present invention it is desirable that the spray pattern be uniform across all of the nozzles, and this is achieved through the use of the intermediate line 14 which eliminates the loss of head in the end nozzles. Thus, liquid pressure for all of the nozzles 18 is substantially equal.

An alternate embodiment of the sprayer of the present invention is shown in FIGS. 7, 8 and 9 in uniform sprayer 100 which is comprised of a generally elliptical body section 102 in airfoil form. For this reason, the sprayer 100 can contribute somewhat of a lift in aerial operations.

As shown in FIG. 8 the body section 102 possesses a generally hollow space 104 which is essentially occupied by a sponge 106 or other absorbent material. The body section 102 is closed off at the ends thereof by caps 108.

The body section 102 further includes an entrance port 110 which is internally threaded in order to be connected preferably to a feeder line or hose which may or may not be designed along the lines of intermediate line 14. The body section 102 also possesses a plurality of discharge nozzles 112 as shown in FIGS. 7, 8 and 9.

As also shown in FIGS. 8 and 9 the sponge or absorbent material 106 substantially fills the internal space 104 with the possible exception of a rear area 114 and a forward area 116 that is adjacent the nozzle 112. The areas 114 and 116 are created through the action respectively of flanges 118 and 120 that are integral with the cap 108 as shown in FIG. 9.

In operation the herbicide or other liquid is fed into the bdoy 102 by attachment of the supply source to entrance port 110. The herbicide or other liquid passes downwardly in the direction of the arrows of FIG. 8 into the sponge or absorbent material 106 and then upwardly to be discharged through the nozzle 112 in laminar flow. The actual flow rate is again a product of the cross-sectional area of the openings of the nozzle 112 and the liquid pressure.

It is seen that whenever the liquid pressure is turned off that the absorptive properties of material 106 will hold substantially all liquid within the space 104 and prevent the same dripping. Should it be desired to replace the absorptive material 106, it is a simple matter to remove one or both of the end caps 108 and replace the absorptive element. It is also to be noted that the absorptive element will equalize pressure of liquid that is being fed to the nozzles 112 and thereby assure further uniformity of spray discharge.

It is thus seen that the present invention provides an effective solution to the problem of drift since the droplets produced thereby are substantially uniform. The method of the present invention involves spraying of liquid in laminar flow from a nozzle which is being simultaneously moved in a direction substantially opposite to the direction of spray discharge. Two forms of the apparatus of the present invention have been disclosed, the second form of which lacks springs, ball valves or other moveable devices for substantially eliminating dripping when the supply valve has been shut off. It is to be emphasized that dripping in itself can cause problems because the powerful properties of a systemic herbicide are such that significant damage could be inflicted by accidental dripping in unwanted areas.

Furthermore, in both embodiments of the invention, the forward speed of the helicopter will generally exceed the backward speed of nozzle discharge. This also has the effect of crowding out or eliminating the formation of satellite particles.

Without further elaboration, the foregoing will so fully illustrate my invention, that others may, by applying current or future knowledge, readily adapt the same for use under various conditions of service.

What is claimed as the invention is:

1. A sprayer comprising a hollow body of airfoil configuration containing an absorbent material therein, a liquid supply, supply means to feed said liquid from said liquid supply to said hollow body to be discharged therefrom in a plurality of rearwardly directed discharge openings whereby excess drippage is substantially eliminated upon shut off of said liquid supply.

2. The invention of claim 1 wherein said absorbent material is a sponge.

3. The invention of claim 2 wherein liquid is fed to said sprayer and discharged therefrom in a stream in laminar flow in a first direction and means to move said sprayer in a direction substantially opposite to the first direction whereby said stream will thereafter break up into droplets of substantially uniform size.

4. The invention of claim 2 wherein said liquid is discharged in a rearward sense and said nozzle is moved in a forward sense at a speed greater than the speed of rearward discharge of said stream.

5. The invention of claim 2 wherein said sprayer is secured to a moving helicopter.

References Cited

FOREIGN PATENTS 8,589 5/1894 Switzerland.

M. HENSON WOOD, Jr., *Primary Examiner.*

HOWARD NATTER, *Assistant Examiner.*

U.S. Cl. X.R.

239—171, 550, 553.3, 571; 244—136